UNITED STATES PATENT OFFICE.

ERNST FISCHER, OF GRONAU, NEAR HANOVER, GERMANY.

IRON-ALBUMIN-GLYCEROPHOSPHATE AND PROCESS OF MAKING SAME.

972,523.

Specification of Letters Patent. Patented Oct. 11, 1910.

No Drawing. Application filed March 9, 1909. Serial No. 482,264. (Specimens.)

*To all whom it may concern:*

Be it known that I, ERNST FISCHER, a subject of the German Emperor, and residing at Gronau, near Hanover, Germany, have invented a certain new and useful Improved Process of Making Iron-Albumin-Glycerophosphate, of which the following is a specification.

The subject-matter of the invention is an improved process of producing iron-albumin preparations.

As is well-known, organic iron salts stimulate the formation of blood. It appeared desirable to produce for anæmic persons an iron remedy which would simultaneously aid the formation of new nerve-substance for their injured nerves as glycerophosphoric acid does and supply new material to the weakened tissues as is effected by pure albumins.

Albumin preparations soluble in water are described in the United States Letters Patent No. 601,995, which preparations are made from glycerophosphates, such as sodium-glycerophosphate, and albumins. What is looked upon as the special advantage of these compounds, their solubility in water, is not unconditionally advantageous for iron compounds, as the danger is present that they prejudicially affect the teeth and stomach. Consequently under certain circumstances it appears more advantageous to produce combinations of albumin and glycerophosphoric acid with iron which are less soluble or insoluble in water. I have done this in the following manner: Casein-sodium-glycerophosphate, the production of which is known from the Letters Patent mentioned above, was treated with iron salts, and a precipitate which is soluble with difficulty was formed. When iron salts of mineral acids were employed, such as ferric chlorid, which, as is well-known, are highly hydrolyzed in aqueous solution, it was found that the combination of albumin and glycerophosphoric acid was almost completely done away with and an iron-casein poor in glycerophosphoric acid resulted. Now when the free acid of the aqueous solution of the iron salt was neutralized by adding soda-lye until the solution showed itself neutral to the indicator Congo red, and when in addition sodium acetate was added to the solution, it was possible to obtain with the same from casein-sodium-glycerophosphoric firstly as an intermediary product a casein-iron-glycerophosphate still containing sodium and soluble in water, and when greater quantities of the solution of the iron salt were employed a casein-iron-glycerophosphate insoluble in water.

The intermediary product which is light brown contained for instance, according to analysis 9.04% of water, 2.35% of iron and 1.48% of phosphorus while the insoluble product which is dark brown contained for instance 6.7% of water and 3.95% of iron with the same quantity of phosphorus above mentioned. Thus in carrying this process into effect intermediary products may be formed, that is casein-iron-sodium-glycerophosphates which are soluble in water. By adding more iron salts casein-iron-glycerophosphates are formed which are insoluble in water.

The invention is carried into effect in substantially the following manner: 200 g. of casein-sodium-glycerophosphate are dissolved in water and an aqueous solution of 30 g. of ferric chlorid added at ordinary temperature after said chlorid solution has been deprived of its acid character by the addition of 185 ccm. of 1:1 sodium hydrate and 50 g. of sodium acetate. A brown precipitate is formed which is separated by filtration, then it is washed with alcohol and ether and finally dried. The resulting product is insoluble in alcohol and water but dissolves easily in the digestive liquids.

I claim:

1. The process of producing iron-albumin-glycerophosphates from soluble alkali-albumin-glycerophosphate and an iron salt consisting in adding a neutralized solution of an iron salt to the solution of alkali-albumin-glycerophosphate in the presence of sodium acetate.

2. The process of producing iron-albumin-glycerophosphates from sodium-albumin-glycerophosphate and an iron salt consisting in adding a neutralized solution of ferric chlorid to the solution of alkali-albumin-glycerophosphate in the presence of sodium acetate until all the sodium has been replaced by iron, and separating the resulting precipitate from the solution.

3. The process of producing iron-albumin-glycerophosphates from sodium-albumin-glycerophosphate and an iron salt consisting in adding a neutralized solution of ferric chlorid to the solution of alkali-albumin-glycerophosphate in the presence of sodium acetate until all the sodium has been replaced by iron, separating the resulting precipitate from the solution, washing same with alcohol and ether, and drying it.

4. As a novel compound, an iron-albumin-glycerophosphate derived from soluble alkali-albumin-glycerophosphate and an iron salt in which all the alkali has been replaced by iron, existing in form of a brownish powder insoluble in water and organic solvents and soluble in diluted acids and alkalies.

5. As a novel compound, an iron-albumin-glycerophosphate derived from sodium-albumin-glycerophosphate and an iron salt in which all the sodium has been replaced by iron, existing in form of a brownish powder insoluble in water and organic solvents and soluble in diluted acids and alkalies.

In testimony whereof, I affix my signature in the presence of two witnesses.

ERNST FISCHER.

Witnesses:
AUGUST L. BIRDEE,
LUISE KATHER,